H. M. BENSON.
TIRE TREAD.
APPLICATION FILED MAR. 2, 1917.
1,254,464. Patented Jan. 22, 1918.
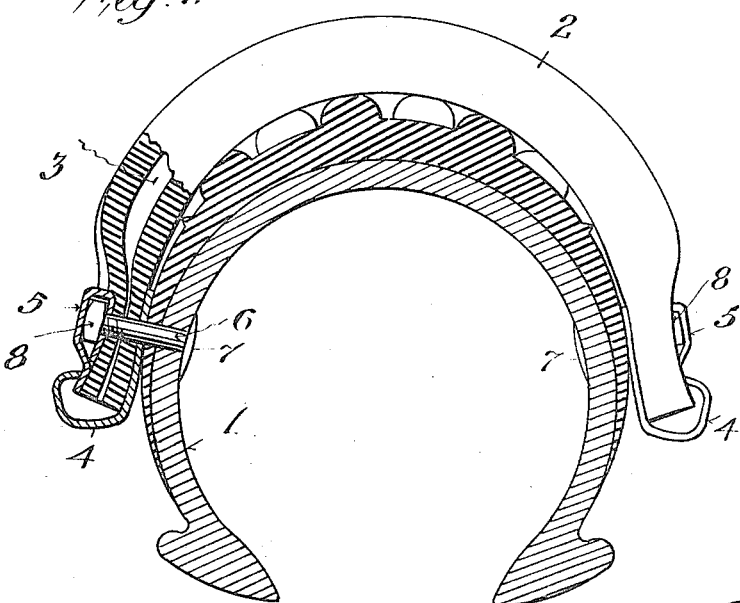
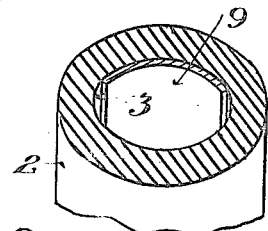
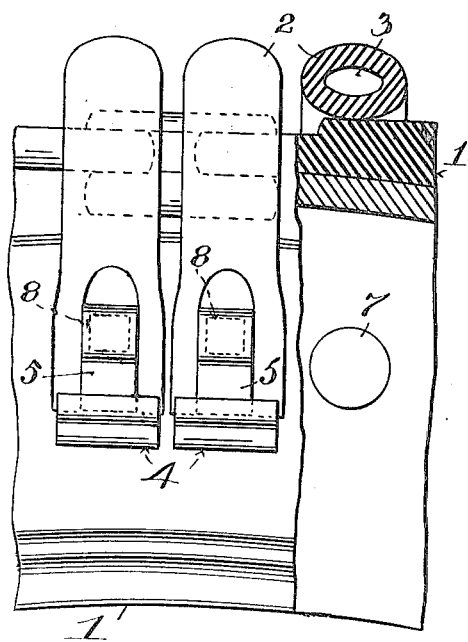
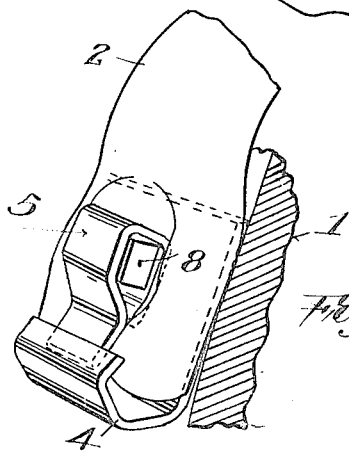

UNITED STATES PATENT OFFICE.

HENRY M. BENSON, OF LOS ANGELES, CALIFORNIA, ASSIGNOR OF ONE-HALF TO LAURA G. FIXEN, OF LOS ANGELES, CALIFORNIA.

TIRE-TREAD.

1,254,464.

Specification of Letters Patent.

Patented Jan. 22, 1918.

Application filed March 2, 1917. Serial No. 151,914.

*To all whom it may concern:*

Be it known that I, HENRY M. BENSON, a citizen of the United States, residing at Los Angeles, county of Los Angles, State of California, have made a certain new and useful Invention in Tire-Treads, of which the following is a specification.

This invention relates to tire treads and particularly to a tread of the resilient type.

The object of the invention is to provide a shield for a tire which is simple in structure, easy of application, and economical of manufacture.

A further object of the invention is to provide a tire tread adapted to be applied to an ordinary tire, and which is resilient, and forms a non-skid surface for the tire.

A further object of the invention is to provide a resilient, strong and durable tread for a tire which will afford added strength and life to the tire, which will prevent blow-outs, puncture of the pneumatic tube within the tire, when pneumatic tires are employed, and which will prevent the tire itself from becoming damaged or cut due to use on rough or rocky roads.

A further object of the invention is to provide a protective non-skid tread for tires which will not cause the tires to become heated in use due to incasing the same.

Further objects of the invention will appear more fully hereinafter.

The invention consists substantially in the construction, combination, location and relative arrangement of parts, all as will be more fully hereinafter set forth, as shown by the accompanying drawing, and finally pointed out in the appended claims.

Referring to the drawing:—

Figure 1 is a view in vertical section of a tire, of conventional structure, having a tread embodying my invention applied thereto, the tread being partially in central vertical section and partly in elevation.

Fig. 2 is a view in side elevation partly in longitudinal section of a section of a tire provided with a tread embodying my invention.

Fig. 3 is a detail view in perspective of one means contemplated in the scope of my invention for affixing the tread elements to the tire.

Fig. 4 is a sectional view of a modified structure of tread element.

The same part is designated by the same reference numeral wherever it occurs throughout the several views.

Many types of armor, or shields or treads of metal or other material are known to the art, which are applied to a tire and over the same for the various purposes of forming a puncture proof coat, a non-skid coat, or a service coat for the tire. Few, if any, of these tire armors have proven satisfactory in the art, due, principally, to the high cost of manufacture of the same, the intricate and complicated structures thereof, and also the objection of the heating of the tire in use. In the latter instance, it is obvious that any casing or coat for the tire will serve to retain the heat of the tire, which is well known to be a serious objection.

It is among the special purposes of my present invention to provide a tread or shield for tires which is simple in structure and which may be readily applied to any tire structure, and which, while furnishing all of the advantages of a shield, overcomes the objections heretofore met within the art by the devices of like nature.

In the embodiment of my invention disclosed by the drawing, but to the specific structure of which my invention, as defined in the claims, is not to be limited or restricted, I show conventionally the tire or shoe 1, in this instance, a shoe of the pneumatic tire type. My invention, however, is not confined in its application to tires of this type, but is equally applicable to other forms and structures of tires. In accordance with my invention I affix to the tire in any suitable manner a plurality of tread elements 2. These tread elements are tubes of sufficient length to extend when bent to conform with the shape of the tire, transversely across the same, as shown in Figs. 1 and 2. The tubes 2 are preferably of rubber of a substantial thickness, or may be of rubber and fiber or canvas such as rubber hose. The tread elements are preferably, though not necessarily, hollow, and preferably round, being provided with the space or passage 3, therethrough.

The tubes or tread elements 2 may be secured to the tire 1 in many ways. I show one way which is simple and efficient, but to which my invention is not to be limited, wherein I provide a clamp 4 at each side of the tire one portion of which is located between the tube 2 and the tire 1. Each end of the tube 2 is provided with a comparatively smaller clamp 5. A rivet bolt 6 provided with a smooth flat head 7 passes through the tire 1, clamp 4, tube 2, and clamp 5. A nut 8, mounted on the end of the rivet bolt 6 is turned thereon to compress the tube 2 as clearly shown in Fig. 1. The clamp 5 is then bent over the nut 8, and the clamp 4 is then in turn bent over to clench the clamp 5, and to thereby effectively lock the respective parts in position, all as clearly shown in Fig. 1.

It may be of advantage for purposes of reinforcement or resiliency to place an insert in the tube 2. For example, a strip or band of wire or metal, rubber or other substance, may be inserted in the tube to extend from end to end thereof, and be held in the clamped position by the rivet bolt 6. I show such an arrangement in Fig. 4 wherein the strip or the like is indicated at 9.

By the structure hereinbefore described, it will be seen that I have provided a simple and efficient tread for tires, which due to the tubular form of the tread elements forms a transversely extending corduroy tread surface which is therefore an efficient non-skid tread. Further, due to the fact that the elements are hollow, and clenched at the ends, great resiliency is secured. The elements do not surround the tire to completely incase the same, and consequently the heat of the tire when in use is dissipated and in addition, the elements are rigidly attached to the side walls of the tire, thereby eliminating side attaching bands or the like, but at the same time, due to the resiliency and elasticity of the elements, allowing a sufficient play between the tread portion of the tire and the tread elements to prevent skidding. The tire itself, in the case of pneumatic tires, becomes puncture proof, and its life is lengthened due to the elimination of wear on the tire. It will be further noted that the clamp 4 is curved or bent outwardly so as to present a smooth curved surface, and consequently in case for any reason the inner tube should become deflated, no sharp edge or shoulder is presented to the outer surface of the tire which might have the tendency to cut or pinch the latter.

As above explained, the transverse elements afford ample space between each other as well as between said elements and the tire or shoe to permit free circulation of air which prevents the heat generated by the contact of the elements with the ground, from being transmitted to the tire or shoe.

While I have shown the elements attached solidly to the tire, it should be noted that the elements are individually removable. In the structure shown, this may be accomplished by bending back the clamps 4 and 5, and removing the nut from the bolt. Various other means may be used according to the attaching means employed.

While I have shown and described a tire tread structure specifically, I wish it to be understood that my invention, as defined in the claims, is not to be limited thereto, as many changes in details of construction will readily suggest themselves to those skilled in the art.

Therefore, what I claim as new and useful, and of my own invention, and desire to secure by Letters Patent is,—

1. The combination with a tire, of tubular tread elements extending transversely across the tread portion of said tire, and means for rigidly attaching the ends of said tubular elements to the side walls of said tire.

2. The combination with a tire, of rubber tube elements extending transversely across the tread portion of said tire, and means for rigidly attaching the ends of said rubber tube elements to the side walls of said tire.

3. The combination with a tire, of tubular tread elements extending transversely across the tread portion of said tire, and bolts passing through the ends of said tubular elements and the side walls of the tire, for securing the former to the latter.

4. The combination with a tire, of tubular tread elements extending transversely across the tread portion of said tire, and bolts passing through the ends of said tubular elements and the side walls of the tire, for securing the former to the latter and means for locking said bolts in place.

5. The combination with a tire, of tread elements extending transversely across the tread portion of said tire, and bolts passing through the ends of said elements and the side walls of the tire, for securing the former to the latter, clamps held by said bolts to extend over the ends thereof, and secondary clamps interposed between the elements and tire and extending over the ends of the elements to clench said first mentioned clamps.

6. The combination with a tire, of tubular tread elements extending transversely across the tread portion of said tire, and bolts passing through the ends of said tubular elements and the side walls of the tire, for securing the former to the latter, clamps held by said bolts to extend over the ends thereof, and secondary clamps interposed between the tubular elements and tire and extending over the ends of the tubular elements to clench said first mentioned clamps.

7. The combination with a tire, of tubular tread elements attached to the side walls of said tire and extending across the tread portion thereof and reinforcing bands extending longitudinally of tread elements.

In testimony whereof I have set my hand, in the presence of the subscribing witnesses, on this 20th day of February, A. D. 1917.

HENRY M. BENSON.

Witnesses:
 EDWARD H. BARKELOW,
 VIRGINIA I. BERINGER.